US012690736B2

(12) United States Patent
Lim et al.

(10) Patent No.: US 12,690,736 B2
(45) Date of Patent: Jul. 28, 2026

(54) ROBOT CLEANER AND CONTROLLING METHOD THEREOF

(71) Applicant: SAMSUNG ELECTRONICS CO., LTD., Suwon-si (KR)

(72) Inventors: Baeseok Lim, Suwon-si (KR); Youngdae Ko, Suwon-si (KR); Jaemin Yoon, Suwon-si (KR); Woosub Lee, Suwon-si (KR); Kibum Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 18/209,277

(22) Filed: Jun. 13, 2023

(65) Prior Publication Data

US 2023/0404345 A1     Dec. 21, 2023

Related U.S. Application Data

(63) Continuation of application No. PCT/KR2023/005968, filed on May 2, 2023.

(30) Foreign Application Priority Data

Jun. 15, 2022    (KR) ......................... 10-2022-0073104

(51) Int. Cl.
| | |
|---|---|
| *A47L 9/28* | (2006.01) |
| *B25J 9/00* | (2006.01) |
| *B25J 15/06* | (2006.01) |
| *G05D 1/00* | (2024.01) |

(52) U.S. Cl.
CPC ........... *A47L 9/2805* (2013.01); *A47L 9/2842* (2013.01); *A47L 9/2852* (2013.01); *B25J 9/0003* (2013.01);

(Continued)

(58) Field of Classification Search
None
See application file for complete search history.

(56) References Cited

U.S. PATENT DOCUMENTS

| | | |
|---|---|---|
| 5,440,216 A | 8/1995 | Kim |
| 6,370,453 B2 | 4/2002 | Sommer |

(Continued)

FOREIGN PATENT DOCUMENTS

| | | |
|---|---|---|
| CN | 105619419 A | 6/2016 |
| CN | 209574563 U | 11/2019 |

(Continued)

OTHER PUBLICATIONS

International Search Report and Written Opinion (PCT/ISA/210, PCT/ISA/220, and PCT/ISA/237) dated Aug. 2, 2023, issued by International Searching Authority for International Application No. PCT/KR2023/005968.

(Continued)

*Primary Examiner* — Donald J Wallace
*Assistant Examiner* — Paysun Wu
(74) *Attorney, Agent, or Firm* — Sughrue Mion, PLLC

(57) ABSTRACT

A robot cleaner is disclosed. The robot cleaner includes a driving device, an obstacle clearing device for clearing an obstacle on a driving route, a memory storing a map of a cleaning area and an obstacle category, and a processor controlling the driving device so that the robot cleaner drives in the cleaning area, wherein the processor may, while the robot cleaner is driving in the cleaning area, control the obstacle clearing device to take a motion corresponding to the obstacle category by an obstacle detected by a sensor.

18 Claims, 18 Drawing Sheets

100

(52) U.S. Cl.
CPC ........ *G05D 1/0274* (2013.01); *A47L 2201/04* (2013.01); *B25J 15/0616* (2013.01)

(56) References Cited

U.S. PATENT DOCUMENTS

| | | | |
|---|---|---|---|
| 9,622,633 | B2 | 4/2017 | Kim et al. |
| 10,071,475 | B2 | 9/2018 | Lin et al. |
| 10,571,918 | B2 | 2/2020 | Xia et al. |
| 11,035,940 | B2 | 6/2021 | Xu et al. |
| 11,413,766 | B2 | 8/2022 | Song et al. |
| 2018/0146126 | A1* | 5/2018 | Tian ..................... H04N 23/685 |
| 2018/0146618 | A1* | 5/2018 | Elazary ................. A01D 46/30 |
| 2019/0086921 | A1 | 3/2019 | Xia et al. |
| 2021/0023705 | A1 | 1/2021 | Chae et al. |
| 2021/0386260 | A1* | 12/2021 | Horn ....................... A47L 11/00 |
| 2022/0168893 | A1* | 6/2022 | Hamilton ............... B25J 9/1666 |
| 2024/0184367 | A1* | 6/2024 | Grenold Loy Dsa .. B25J 13/025 |

FOREIGN PATENT DOCUMENTS

| | | | |
|---|---|---|---|
| CN | 114468859 | A | 5/2022 |
| DE | 10 2017 112 740 | A1 | 12/2018 |
| JP | 2007-68675 | A | 3/2007 |
| JP | 2015-9109 | A | 1/2015 |
| JP | 2016-86906 | A | 5/2016 |
| JP | 6331971 | B2 | 5/2018 |
| JP | 2022-26355 | A | 2/2022 |
| JP | 2022-520515 | A | 3/2022 |
| KR | 10-0783146 | B1 | 12/2007 |
| KR | 10-1973625 | B1 | 4/2019 |
| KR | 10-2252256 | B1 | 5/2021 |
| KR | 10-2297759 | A1 | 9/2021 |

OTHER PUBLICATIONS

Communication dated Jul. 29, 2025, issued by the European Patent Office in counterpart European Application No. 23824083.2.
Communication issued Sep. 30, 2025 by the Korean Intellectual Property Office in counterpart Korean Patent Application No. 10-2022-0073104.
Communication dated Apr. 23, 2026, issued by the Korean Ministry of Intellectual Property in Korean Application No. 10-2022-0073104.

* cited by examiner

ROBOT CLEANER AND CONTROLLING METHOD THEREOF

CROSS-REFERENCE TO RELATED APPLICATION(S)

This application is a bypass continuation of International Application No. PCT/KR2023/005968, filed on May 2, 2023, in the Korean Intellectual Property Receiving Office, which is based on and claims priority to Korean Patent Application No. 10-2022-0073104, filed on Jun. 15, 2022, in the Korean Intellectual Property Office, the disclosures of which are incorporated by reference herein in their entireties.

BACKGROUND

1. Field

The disclosure relates to a robot cleaner that suctions foreign substances such as pollutants and dust, etc. existing on a surface to be cleaned, and a controlling method thereof.

2. Description of Related Art

An autonomous driving robot is a device that performs a specific task while driving in an area without a user's manipulation. A robot can perform autonomous driving in substantial parts, and such autonomous driving may be implemented in various manners. For example, a robot may drive along a defined route by using a map corresponding to a cleaning area, and may also drive without a defined route by using a sensor detecting the surrounding environment.

A robot cleaner is a device that cleans a surface to be cleaned by driving in a cleaning area without a user's manipulation. The robot cleaner may be used in removing dust or wiping a surface to be cleaned in a home. Here, the dust may mean (soil) dust, specks, powder, fragments, and other dust particles that can be collected by a vacuum cleaner or an automatic or a semi-automatic cleaning device.

If a toy or a towel, a cable, etc. are placed in a cleaning area, these objects may become obstacles that interfere with driving of a robot cleaner. Accordingly, there is inconvenience of having to take away obstacles in advance before operating the robot cleaner so that they may not interfere with the driving of the robot cleaner.

SUMMARY

The disclosure was devised for addressing the aforementioned need, and the purpose of the disclosure is in providing a robot cleaner that performs cleaning while taking away obstacles on the driving route by itself, and a controlling method thereof.

A robot cleaner according to an embodiment of the disclosure includes a driving device, an obstacle clearing device for clearing an obstacle on a driving route, a memory storing a map of a cleaning area and an obstacle category, and a processor controlling the driving device, wherein the processor is configured to navigate the robot cleaner by driving the robot cleaner in the cleaning area, wherein the processor may, while the robot cleaner is driving in the cleaning area, control the obstacle clearing device to take a motion corresponding to the obstacle category of the obstacle, wherein the obstacle may be detected by a sensor.

The processor may, based on identifying that the obstacle is of a first type, control the obstacle clearing device to grasp the obstacle by suction force and move the obstacle off the driving route, and based on identifying that the obstacle is of a second type, control the obstacle clearing device to push the obstacle and move the obstacle off the driving route.

The processor may, based on a weight of the obstacle exceeding a threshold torque of the obstacle clearing device, control the driving device so that the robot cleaner avoids the obstacle.

The obstacle clearing device may include an arm device in an upper part of a main body of the robot cleaner, wherein the arm device is to be rotatable in a left direction and in a right direction with respect to the robot cleaner to move the obstacle, and the processor may control a first motor driving the arm device, wherein the first motor is configured to project the arm device from the obstacle clearing device, and control a second motor driving the obstacle clearing device, wherein the second motor may rotate the obstacle clearing device toward a left side or toward a right side with respect to the robot cleaner.

The obstacle clearing device may include a suction device providing a suction force to a head part of the arm device, and the processor may control the suction device to grasp by the suction force the obstacle to the head part.

A robot cleaner according to an embodiment of the disclosure may include a main body including an opening, a driving device moving the main body, a suction fan motor which is provided on the main body, wherein the suction fan motor may suction foreign substances through the opening, and an obstacle clearing device provided in an upper part of the main body, wherein the obstacle clearing device may take away an obstacle present on a driving route.

The obstacle clearing device may include a base which is connected to be rotatable in a left direction and in a right direction with respect to the main body, an arm device configured to be slidable on the base, a rotation device configured to rotate the base in left and right directions, a sliding device configured to move the arm device in a straight direction, and a second suction device configured to provide a suction force to the arm device.

The arm device may include a moving part configured to move along a top surface of the base, an arm hinge-connected to the moving part and wherein a head part is provided on a front end of the arm, a tilting device configured to tilt the head part in upper and lower directions, and the arm may include a bending part for tilting the head part to the upper side or the lower side according to an operation of the tilting device.

The obstacle clearing device may further include a guide part including a horizontal guide section which moves the moving part and the arm in a horizontal direction, and a tilted guide section that moves the arm in a lower direction.

The tilting device may include a motor, a tilting belt which is driven to rotate in a forward manner or to rotate in a reverse manner according to a driving direction of the motor, a first operating member and a second operating member which are connected to the tilting belt, and move in opposite directions from each other when the tilting belt is driven to rotate in the forward manner or to rotate in the reverse manner, a first wire of which a first end is connected to the first operating member and a second end is connected to the head part, and a second wire of which a first end is connected to the second slider and a second end is connected to the head part.

The bending part of the arm may include a plurality of connecting members connected by a chain method.

The head part may be connected with a vacuum suction pump through a suction pipe arranged along the inner side of the arm.

The obstacle clearing device may further include a foreign substance collecting bin arranged between the suction pipe and the vacuum suction pump.

An obstacle detection sensor may be arranged in the head part.

At least one proximity sensor may be arranged in the head part.

A controlling method of a robot cleaner according to an embodiment of the disclosure may include the steps of, while driving in a cleaning area included in a map, identifying an obstacle type of an obstacle on a driving route of the cleaning area based on information acquired through a sensor, and controlling an obstacle clearing device to move the obstacle to a location off the driving route according to the obstacle type.

The step of identifying the obstacle type may include the step of comparing an acquired image with obstacles included in an obstacle category stored in a memory, and determining the obstacle type.

The step of controlling the obstacle clearing device may include the step of, grasping by suction force the obstacle, wherein the suction force is based on the obstacle type, and moving the obstacle off the driving route.

The step of controlling the obstacle clearing device may include the step of, moving, based on the obstacle type, the obstacle off the driving route by pushing.

The controlling method of a robot cleaner may further include the step of, based on a weight of the obstacle exceeding a threshold torque of the obstacle clearing device, the robot cleaner avoiding the obstacle.

A robot cleaner according to an embodiment of the disclosure can clean while actively taking away obstacles such as clothes or toys, etc. placed in a cleaning area, and thus reduction of the cleaning area by such obstacles can be prevented, and the inconvenience that a user has to organize obstacles placed in a cleaning area by himself/herself before cleaning can be resolved.

Also, a robot cleaner according to an embodiment of the disclosure can easily clean a corner part that is difficult to be accessed by the robot cleaner by using an arm device for taking away obstacles, and thus cleaning efficiency can be improved.

BRIEF DESCRIPTION OF DRAWINGS

FIG. 3 is a block diagram schematically illustrating a configuration of a robot cleaner according to an embodiment of the disclosure;

DETAILED DESCRIPTION

Figure 1:
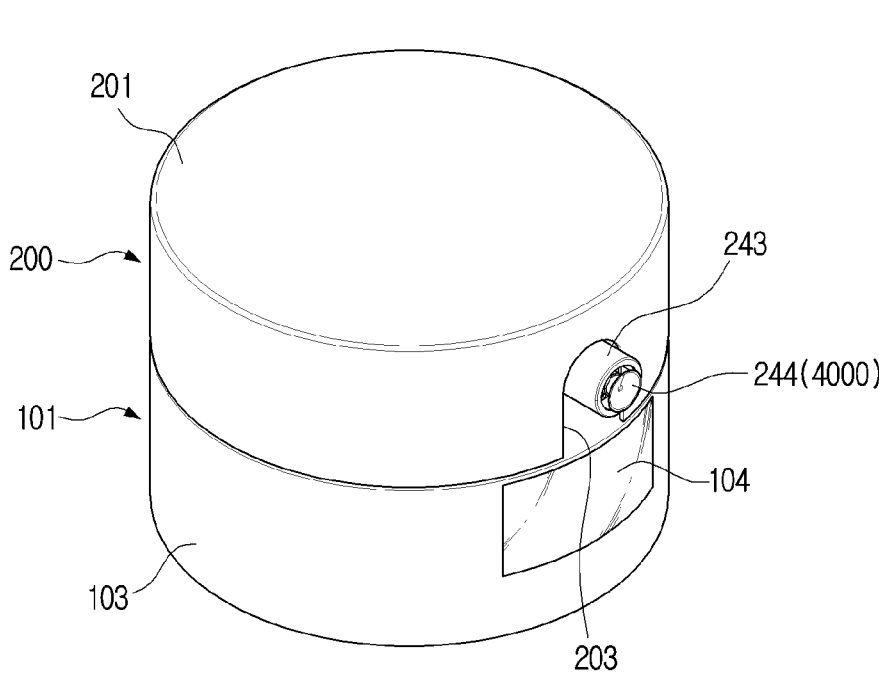
FIG. 1 is a perspective view illustrating a robot cleaner according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In describing the disclosure, in case it is determined that detailed explanation of related known functions or features may unnecessarily confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

The terms used in the disclosure are used only to explain specific embodiments, and are not intended to limit the scope of the disclosure. Further, singular expressions include plural expressions, unless defined obviously differently in the context.

In the disclosure, expressions such as "have," "may have," "include," and "may include" denote the existence of such characteristics (e.g.: elements such as numbers, functions, operations, and components), and do not exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1)

including at least one A, (2) including at least one B, or (3) including at least one A and at least one B.

The expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured (or set) to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

In the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary skill in the art to which the disclosure belongs can easily carry out the disclosure.

Figure 2:
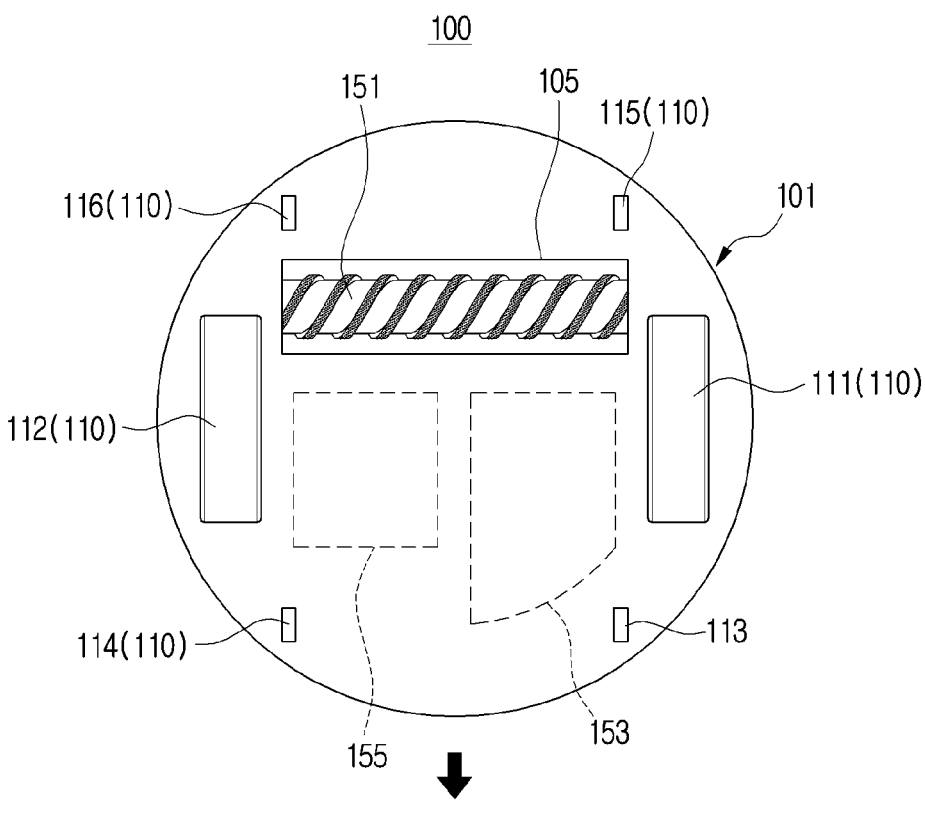
FIG. 2 is a bottom view illustrating a robot cleaner according to an embodiment of the disclosure.

FIG. 1 is a perspective view illustrating a robot cleaner according to an embodiment of the disclosure, and FIG. 2 is a bottom view illustrating a robot cleaner according to an embodiment of the disclosure.

Referring to FIG. 1, the robot cleaner 100 may perform a cleaning operation while driving in a cleaning area. Here, the cleaner area may include various places wherein the robot cleaner 100 can drive, such as a house, an office, a hotel, a factory, a store, etc.

The cleaning operation of the robot cleaner 100 may mean the operation of the robot cleaner 100 of suctioning foreign substances such as pollutants and dust, etc. existing on a surface to be cleaned. The robot cleaner 100 may include a cleaning device for suctioning foreign substances.

The robot cleaner 100 may include a cleaner main body 101, and an obstacle clearing device 200 that is arranged to be rotatable in the upper part of the cleaner main body 101.

The cleaner main body 101 may include a first housing 103 forming the exterior. A window 104 for some sensors that will be described below may be coupled to the outer circumference of the first housing 103. The window 104 may consist of a transparent material through which a light emitted from a sensor can pass.

Referring to FIG. 2, the cleaning device may include a brush 151 that is installed to be rotatable on an opening 105 formed on the bottom surface of the robot cleaner 100. The cleaning device may suction foreign substances from a surface to be cleaned by generating a suction force through a suction fan motor 155. Here, the brush 151 may rotate and draw foreign substances that are not easily collected by the suction force to the opening 105. The foreign substances suctioned through the opening 105 may be housed in a foreign substance collecting bin 153 provided on the robot cleaner 100.

The driving device 110 (refer to FIGS. 2 and 3) may include a pair of main wheels 111, 112 that are arranged to be rotatable respectively on the left and right sides of the cleaner main body 101, a pair of front subsidiary wheels 113, 114 arranged respectively on the front side of the pair of main wheels 111, 112, and a pair of rear subsidiary wheels 115, 116 arranged respectively on the rear side of the pair of main wheels 111, 112. Also, the driving device 110 may include a driving motor for running (not shown) for driving the pair of main wheels 111, 112 to rotate forward or rotate reversely. The driving motor for running may be controlled by the processor 140.

Figure 3:
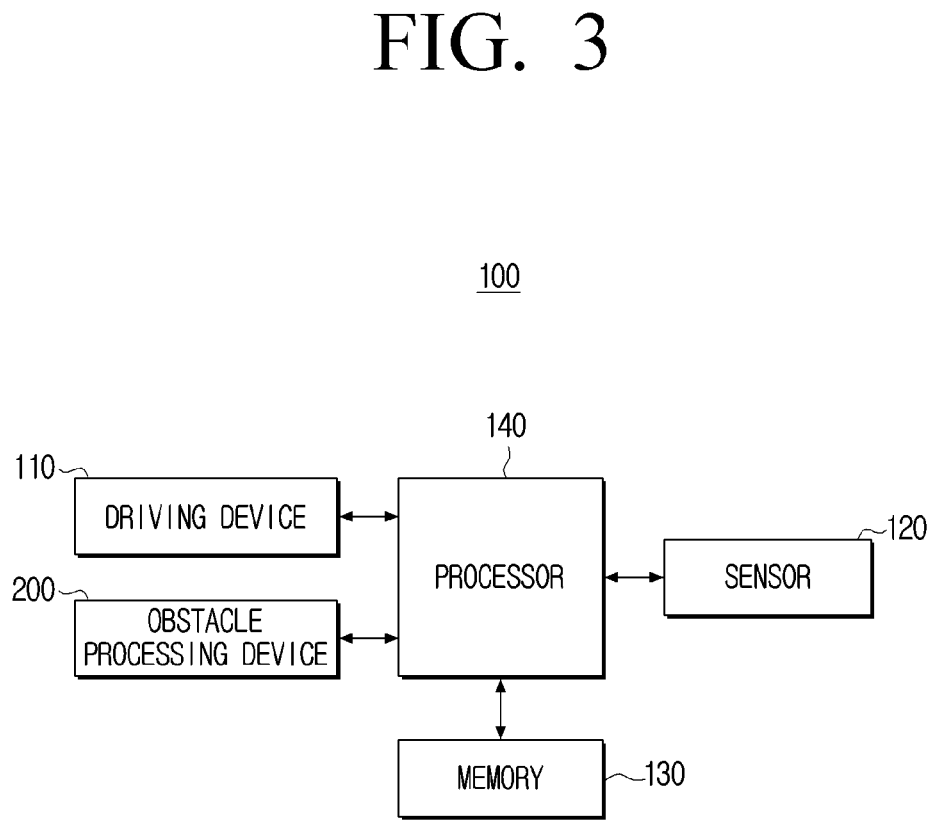

FIG. 3 is a block diagram schematically illustrating a configuration of a robot cleaner according to an embodiment of the disclosure.

Referring to FIG. 3, the robot cleaner 100 may include a driving device 110, a sensor 120, a memory 130, a processor 140, and an obstacle clearing device 200.

The driving device 110 may be controlled by the processor 140, and move the robot cleaner 100 in a cleaning area.

Figure 18:
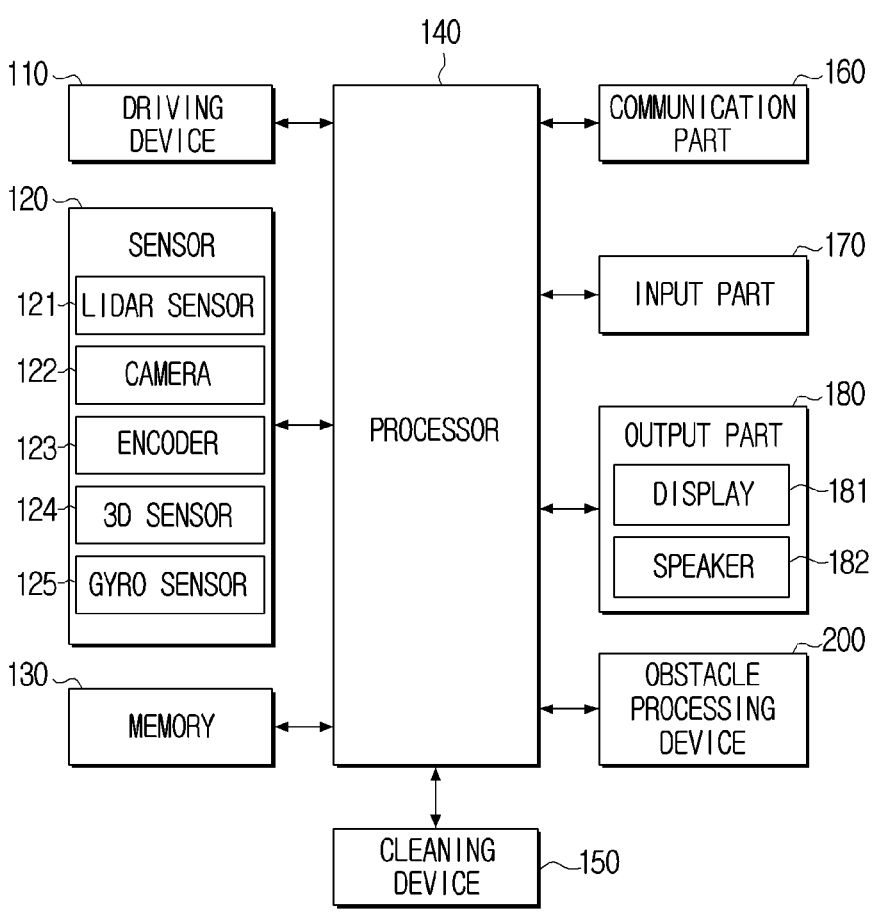
FIG. 18 is a block diagram for illustrating a detailed configuration of a robot cleaner according to an embodiment of the disclosure.

The sensor 120 may include a LiDAR sensor 121 (refer to FIG. 4), a camera 122 (refer to FIG. 4), and an encoder 123 (refer to FIG. 18). Also, the sensor 120 may include a depth sensor, an IR stereo sensor, etc.

The LiDAR sensor 121 may be configured to transmit a laser light while rotating by 360 degrees, and detect the distance between the robot cleaner 100 and an ambient object (e.g., an obstacle placed on a surface to be cleaned). For example, if the laser light is reflected from an object around the robot cleaner 100 and is received, the LiDAR sensor may detect the distance from the object based on the time when the laser light was received, or detect the distance from the object by measuring the changed amount of the phase of the received laser light.

The camera 122 is a component for acquiring one or more obstacle images around the robot cleaner 100. The camera 122 may be implemented as an RGB camera, a 3D camera, etc. The RGB camera may convert light into a charge by using a charge-coupled device (CCD) as a color sensor, and detect an ambient color. The 3D camera may be implemented as a TOF camera including a time of flight (TOF) sensor and an infrared light. The 3D camera may include an IR stereo sensor.

The encoder 123 may be, for example, a rotary encoder measuring a rotation angle displacement. The encoder 123 may be coupled or directly connected to the axis of a rotation driving motor 220 (refer to FIG. 6) that rotates the obstacle clearing device 200 to the left side or the right side and receive a rotation force of the axis, and transmit the force to the processor 140.

In the memory 130, a map may be stored corresponding to a cleaning area generated by the processor 140 based on sensing data of the sensor 120.

In the memory 130, a category may be stored for obstacles that the robot cleaner 100 can take away by itself while driving. The obstacle category may be data wherein obstacle images are classified for each form. The obstacle images may be, for example, images of a glass product, a cable, a doll, a toy, a book, excrements of a pet, etc.

In the obstacle category, obstacles consisting of a hard material of which form is not changed or of a material that is breakable, e.g., a glass product, a book, etc. may be classified as obstacles that can be moved by lifting. Also, in the obstacle category, obstacles consisting of a form that can be easily modified when an external force is applied or a form or a material that is difficult to be adsorbed by a suction force, e.g., a cable, a doll, a toy, etc. may be classified as obstacles that can be moved by pushing. Further, in the obstacle category, obstacles of a form which cannot be moved, e.g., in case the weight of excrements of a pet or an obstacle exceeds a threshold torque of the rotation driving motor 220 rotating the obstacle clearing device 200 to the left side or the right side, the obstacles may be classified as obstacles that should be avoided without being moved.

The memory 130 may house a program for performing motions corresponding to the forms classified in the obstacle category. The motions may be, for example, a motion of lifting an obstacle from a surface to be cleaned and moving it to a different location, a motion of pushing an obstacle and moving it to a different location, a motion of avoiding an obstacle without moving it, etc.

The processor 140 may generate a map for a cleaning area. Then, the processor 140 may store the generated map in the memory 130.

For example, to generate a map, the processor 140 may set a location (e.g., a coordinate) wherein the robot cleaner 100 starts driving and a rotation angle of the robot cleaner 100 respectively as a reference location and a reference rotation angle. Then, to generate a map, the processor 140 may acquire the location (e.g., the coordinate) of the robot cleaner 100 and the rotation angle (e.g., the rotation angle to which the location of the robot cleaner 100 is reflected) through a simultaneous localization and mapping (SLAM) algorithm, by using the distance between the robot cleaner 100 and an ambient object, and the rotation angle and the moving distance of the robot cleaner 100 acquired while the robot cleaner 100 is driving as inputs of the SLAM algorithm. In this case, the processor 140 may acquire the distance between the robot cleaner 100 and the ambient object through the LiDAR sensor 121. Then, the processor 140 may calculate the rotation angle of the robot cleaner 100 based on the angular velocity of the robot cleaner 100 acquired through the gyro sensor, and calculate the moving distance of the robot cleaner 100 based on the number of rotations of the wheels acquired through an encoder. The encoder for detecting the number of rotations of the wheels is an encoder that is different from the aforementioned encoder 123.

Afterwards, while the robot cleaner 100 is moving from the reference location to the acquired location, the processor 140 may identify the location (e.g., the coordinate) of an obstacle from the reference location to the acquired location based on the distance between the robot cleaner 100 and the ambient object acquired through the LiDAR sensor.

The processor 140 may repeatedly perform the aforementioned process while the robot cleaner 100 is moving in a space, and generate a map corresponding to the space wherein the robot cleaner 100 is located. However, the disclosure is not limited to this embodiment, and the processor 140 may also generate a map by using various known methods.

The processor 140 may control the driving device 110 to drive in a cleaning area included in a map based on information acquired through the sensor 120.

Here, the cleaning area may be each of a plurality of areas of which maps are distinguished. That is, the robot cleaner 100 may perform cleaning for each area, and specifically, the robot cleaner 100 may perform cleaning while moving in one area, and when cleaning for the area is completed, the robot cleaner 100 may move to a different area and perform cleaning for the different area.

In this case, the processor 140 may generate a map corresponding to the space wherein the robot cleaner 100 is located by using the SLAM algorithm.

For example, the processor 140 may acquire the location and the rotation angle of the robot cleaner 100 on a map through the SLAM algorithm by using the distance between the robot cleaner 100 and the ambient object, and the rotation angle and the moving distance of the robot cleaner 100 as inputs of the SLAM algorithm. Then, the processor 140 may control the driving device 110 so that the robot cleaner 100 drives in the cleaning area of the map based on the acquired location and rotation angle of the robot cleaner 100.

The processor 140 may detect an obstacle around the robot cleaner 100 based on the map, the location and the rotation angle of the robot cleaner 100 on the map, and the distance between the robot cleaner 100 and the ambient object acquired through the LiDAR sensor 121.

The processor 140 may compare an obstacle image on the driving route acquired by the camera 122 and obstacle images included in the obstacle category stored in the memory 130, and control the obstacle clearing device 200 to perform a motion for obstacle clearing according to the comparison result. In case it is determined that the obstacle image belongs to the classification of obstacles that cannot be moved, the processor 140 may control the driving device 110 so that the robot cleaner 100 avoids the obstacle.

While performing a motion of taking away the obstacle (e.g., a motion of moving the obstacle off the route of the robot cleaner such as moving the obstacle to a different location from the driving route of the robot cleaner), in case it is determined that an output signal is different compared to an operation signal of the rotation driving motor 220 input from the encoder 123 or an operation signal was not input, the processor 140 may determine that the weight of the obstacle exceeds the threshold torque of the rotation driving motor 220, and recognize the situation as an emergency situation. In this case, the processor 140 may stop the operation of the rotation driving motor 220, and reset the rotation axis of the rotation driving motor 220 to the initial location.

In case it is determined that the rotation axis of the rotation driving motor 220 cannot return to the initial location based on a signal input through the encoder 123, the processor 140 may output a warning message and a warning sound indicating the operation-disabled state of the obstacle clearing device 200.

Hereinafter, the obstacle clearing device 200 of the robot cleaner 100 according to an embodiment of the disclosure will be described in detail with reference to the accompanying drawings.

Figure 4:
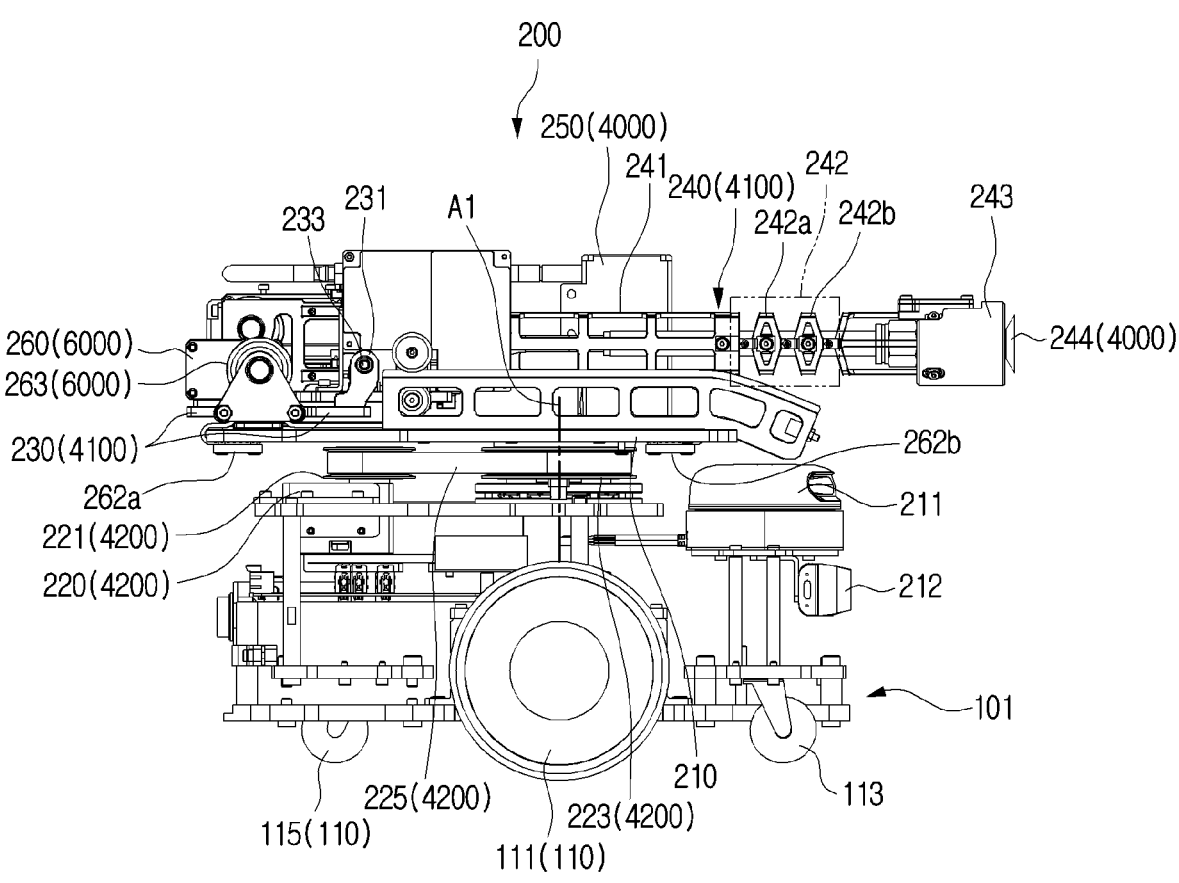
FIG. 4 is a side view illustrating the inside of an obstacle clearing device according to an embodiment of the disclosure.
Figure 5:
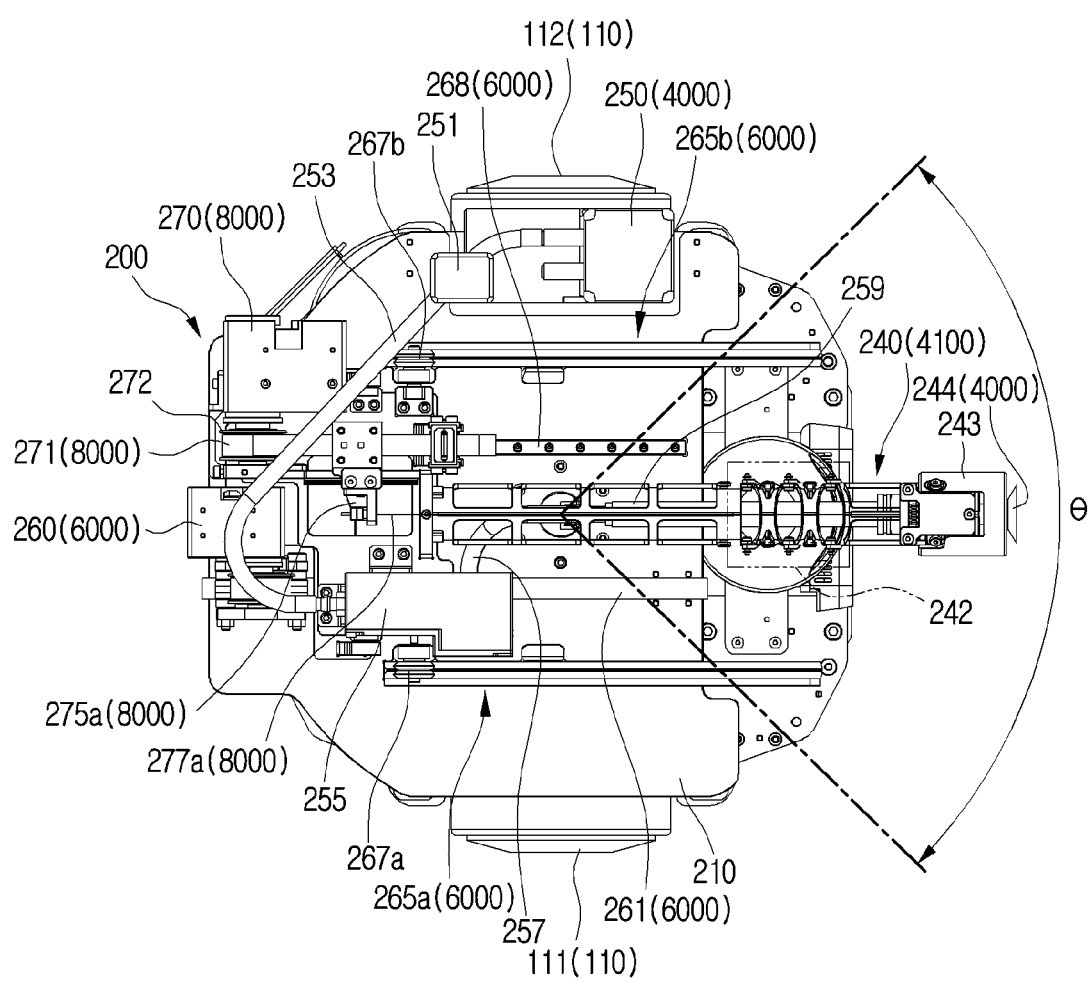
FIG. 5 is a plan view illustrating the inside of an obstacle clearing device according to an embodiment of the disclosure.
Figure 6:
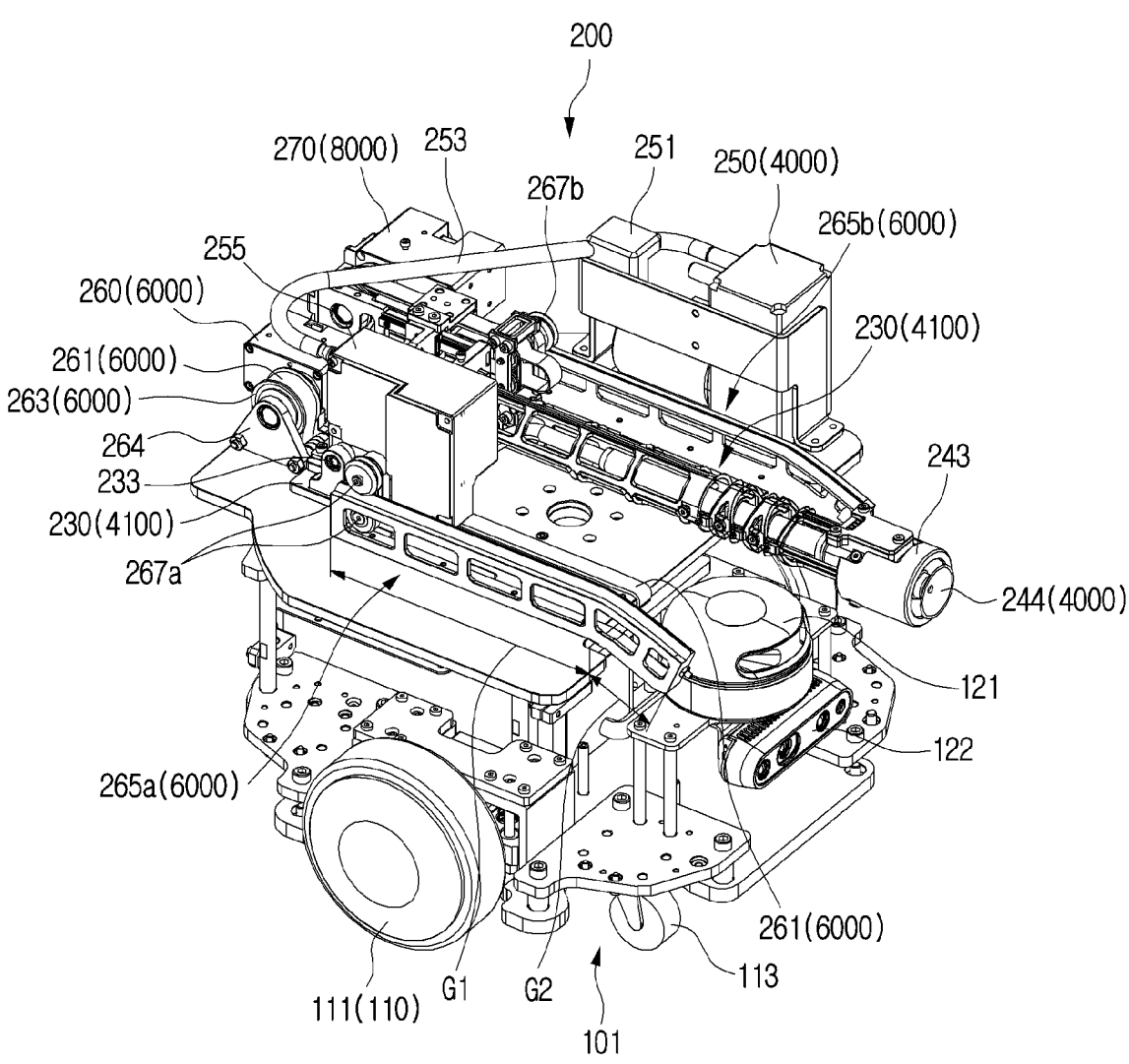
FIG. 6 and FIG. 7 are perspective views illustrating the inside of an obstacle clearing device according to an embodiment of the disclosure.

FIG. 4 is a side view illustrating the inside of an obstacle clearing device according to an embodiment of the disclosure, FIG. 5 is a plan view illustrating the inside of an obstacle clearing device according to an embodiment of the disclosure, and FIG. 6 is a perspective view illustrating the inside of an obstacle clearing device according to an embodiment of the disclosure.

The obstacle clearing device 200 according to an embodiment of the disclosure may be arranged to be rotatable to the left side or the right side in the upper part of the cleaner main body 101. This motion may also be described as rotation toward the left or toward the right. The obstacle clearing device 200 may recognize an obstacle existing on the driving route (an obstacle not included in the map data of the cleaning area) while the robot cleaner 100 is driving in the cleaner area and cleaning the surface to be cleaned, and move the obstacle to a different location (e.g., off the route to a location that does not interfere with the driving of the robot cleaner 100), and continue cleaning.

The obstacle clearing device 200 may include a second housing 201 forming the exterior. On one circumferential surface of the second housing 201, a through hole 203 may be formed so that an arm 240 can project (refer to FIG. 1).

Figure 8:
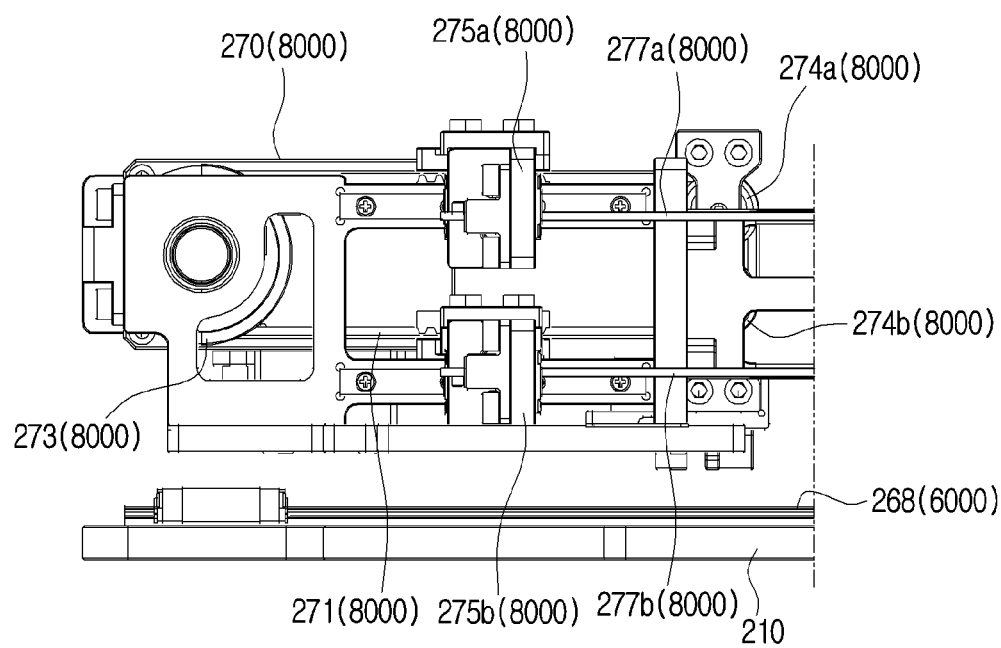
FIG. 8 is an enlarged view illustrating a tilting device of an obstacle clearing device according to an embodiment of the disclosure.

Referring to FIGS. 4, 6 and 8 the obstacle clearing device 200 may include a base 210, a rotation device 4200, an arm device 4100, a sliding device 6000, and a tilting device 8000.

The base 210 may be arranged to be rotatable to the left side or the right side in the upper part of the cleaner main body 101 by the rotation device 4200. On the top surface of the base 210, the arm device 4100, the sliding device 6000, and the tilting device 8000 may be arranged.

The rotation device 4200 may rotatably drive the base 210 to the left side or the right side. In this case, the arm device 4100 may perform a motion of taking away an obstacle on the driving route while rotating to the left side or the right side together with the base 210 when the base 210 rotates. The rotation angle θ (refer to FIG. 5) of the arm device 4100 may be an angle of a degree that an obstacle can be moved to a different location from the driving route so that the robot cleaner 100 can drive smoothly without a route of the robot cleaner 100 being obstructed by the obstacle, e.g., 90 degrees, but is not limited thereto. For example, the rotation angle θ of the arm device 4100 may be 180 degrees, 270 degrees, or 360 degrees.

The rotation device 4200 may be arranged on the lower side of the base 210. The rotation device 4200 may include a rotation driving motor 220, a first pulley 221, a second pulley 223, and a first driving belt 225.

The rotation driving motor 220 may be fixed to a part of the cleaner main body 101. The rotation driving motor 220 may be a servo motor that can rotate forward or rotate reversely.

The first pulley 221 may be connected to the rotation axis of the rotation driving motor 220, and transmit a rotation force to the second pulley 223 through the first driving belt 225.

The second pulley 223 may be connected to the rotation axis arranged on the cleaner main body 101. The second pulley 223 may be connected to the bottom surface of the base 210 through a plurality of fastening holes. Accordingly, when the second pulley 223 is driven to rotate forward or rotate reversely centered around the rotation axis A1 of the second pulley 223, the base 210 may rotate forward or rotate reversely together with the second pulley 223.

The arm device 4100 may include a moving part 230 and an arm 240.

The moving part 230 may proceed forward or backward in a straight direction from the top surface of the base 210 by the sliding device 6000. In this case, the moving part 230 may be connected with the arm device 4100.

The arm 240 may include a straight part 241, a bending part 242, and a head part 243.

On the front end of the straight part 241, the bending part 242 may be arranged. The rear end of the straight part 241 may be connected to a bracket 231 installed on the moving part 230 through a hinge axis 233. Accordingly, the straight part 241 may not only take a horizontal posture (e.g., a posture substantially parallel to the base 210, refer to FIG. 4), but also a downward-tilted posture based on the hinge axis 233 (refer to FIG. 9).

The bending part 242 may be arranged on the front end of the straight part 241, and may include a first connecting member 242a and a second connecting member 242b connected by a chain method so as to be bendable to the upper side or the lower side by the tilting device 8000.

The first connecting member 242a may be connected to be hinged to the front end of the straight part 241. The second connecting member 242b may be hinge-connected respectively to the first connecting member 242a and the head part 243.

The bending part 242, in a non-limiting example, consists of two connecting members 242a, 242b. As another example, the bending part 242 may include three or more connecting members connected by a chain method. In this case, the entire length of the arm 240 and the weight of the arm 240 may be increased as the number of the connecting members is increased. Accordingly, the number of the connecting members may be configured so that a motion of taking away an obstacle can be performed smoothly, and no substantial influence is exerted on the tilting operation of the head part 243. Also, in case three or more connecting members are included, the connecting members may be manufactured with a material which has a light weight and has rigidity, so that the weight of the connecting members can be minimized.

On the front end of the head part 243, an adsorption nozzle 244 may be arranged. The adsorption nozzle 244 may be adsorbed to an obstacle by using a negative pressure, that is, the adsorption nozzle 244 may grasp the obstacle using a suction force. The adsorption nozzle 244 may be formed with a material having flexibility so as to be adhered to the surface of an obstacle smoothly. The negative pressure provided to the adsorption nozzle 244 may be provided from a vacuum suction pump 250. A second suction device 4000 includes the vacuum suction pump 250 and the adsorption nozzle 244.

Referring to FIG. 5, the adsorption nozzle 244 may be connected with the vacuum suction pump 250 through the first to third suction pipes 253, 257, 259.

The first suction pipe 253 may connect the vacuum suction pump 250 and a subsidiary foreign substance collecting bin 255. The first suction pipe 253 may be fixed to a support 251. The second suction pipe 257 may be connected to the subsidiary foreign substance collecting bin 255. The third suction pipe 259 may be arranged along the inner sides of the straight part 241 and the bending part 242 of the arm 240. The third suction pipe 259 may connect the second suction pipe 257 and the adsorption nozzle 244. In this case, the second suction pipe 257 may be formed with a material having flexibility so that the bending part 242 can be bended smoothly at the time of tilting driving.

In the disclosure, as the subsidiary foreign substance collecting bin 255 is provided on the obstacle clearing device 200, a foreign substance in a corner that is difficult to access by the robot cleaner 100 may be collected by using the arm 240. The adsorption nozzle 244 may be used in selectively moving an obstacle, and may be used in suctioning the dust on a surface to be cleaned. On the inner side of the subsidiary foreign substance collecting bin 255, a dust filter may be arranged to prevent introduction of a foreign substance (e.g., dust) collected inside into the vacuum suction pump 250.

Meanwhile, in the head part 243, an additional camera for recognizing obstacles may be arranged. In the case of installing an additional camera in the head part 243, the weight of the head part 243 may increase, and due to this, load may increase on the motor 270 of the tilting device 8000. Accordingly, to minimize exertion of influence on tilting driving due to increase of the weight of the head part 243, a small-size RGB camera may be adopted for the camera. Also, in the head part 243, a plurality of proximity sensors may be arranged so that the head part 243 can avoid collision with a nearby structure or obstacle at the time of a sliding operation or a tilting operation of the arm 240. The proximity sensors may sense the structure or obstacle and motion of the head part 243 adjusted to avoid the collision.

Referring to FIG. 5 and FIG. 6, the sliding device 6000 may make the arm device 4100 proceed forward or backward in a straight direction. Also, the sliding device 6000 may include a sliding driving motor 260, a second driving belt 261, a first driving roller 263, a first guide rail 265a, a second guide rail 265b, and a third guide rail 268.

The sliding driving motor 260 may be fixed to a part of the moving part 230. The sliding driving motor 260 may be a servo motor that can rotate forward or rotate reversely.

Opposite ends of the second driving belt 261 may be fixed by fixing holes 262a, 262b (refer to FIG. 4) arranged on the rear end and the front end of the bottom surface of the base 210.

The first driving roller 263 may be rotatably supported by a bracket 263 installed on the moving part 230. The first driving roller 263 may be connected to the rotation axis of the sliding driving motor 260, and rotate forward or rotate reversely together with the rotation axis.

The moving part 230 and the arm 240 that is hinge-connected thereto may proceed forward (e.g., move to the front side of the robot cleaner 100 or the front side of the base 210) along the first to third guide rails 265a, 265b, 268 in case the first driving roller 263 rotates forward. In this case, the arm 240 may project more lengthily from the cleaner main body 101 (refer to FIG. 9).

In contrast, in case the first driving roller 263 rotates in a reverse manner, the arm 240 may proceed backward along the first to third guide rails 265a, 265b, 268. In this case, the arm 240 may return to the original location (refer to FIG. 4).

The first guide rail 265a and the second guide rail 265b may be arranged in parallel at an interval on the top surface of the base 210.

The first guide rail 265a may include a straight section G1 and an inclined section G2 continued from the straight section G1. To the first guide rail 265a, a pair of first guide rollers 267a rotatably connected to one side of the arm 240 may be slidably coupled. The pair of first guide rollers 267a may slide along the straight section G1 and the inclined section G2 of the first guide rail 265a.

While the pair of first guide rollers 267a slide along the straight section G1 of the first guide rail 265a, the moving part 230 and the arm 240 may move substantially in parallel to the top surface of the base 210.

While the pair of first guide rollers 267a slide along the inclined section G2 of the first guide rail 265a, the arm 240 of which rear end is hinge-connected to the moving part 230 may move to be inclined in a lower direction. In this case, the moving part 230 may move substantially in parallel to the top surface of the base 210, unlike the arm 240.

The second guide rail 265b may be formed of a shape identical to the first guide rail 265a, and a pair of second guide rollers 267b that are rotatably connected to the other side of the arm 240 may be slidably coupled to the second guide rail 256b.

As described above, by providing an inclined section in the first and second guide rails 265a, 265b, the adsorption nozzle 244 of the head part 243 can easily adsorb an obstacle existing on a surface to be cleaned, and collect foreign substances existing in a corner of a cleaning area.

The third guide rail 268 may be fixed to the top surface of the base 210, and may be arranged in parallel with the first and second guide rails 265a, 265b. On the bottom surface of the moving part 230, a sliding block that is slidably connected to the third guide rail 268 may be arranged.

Figure 7:
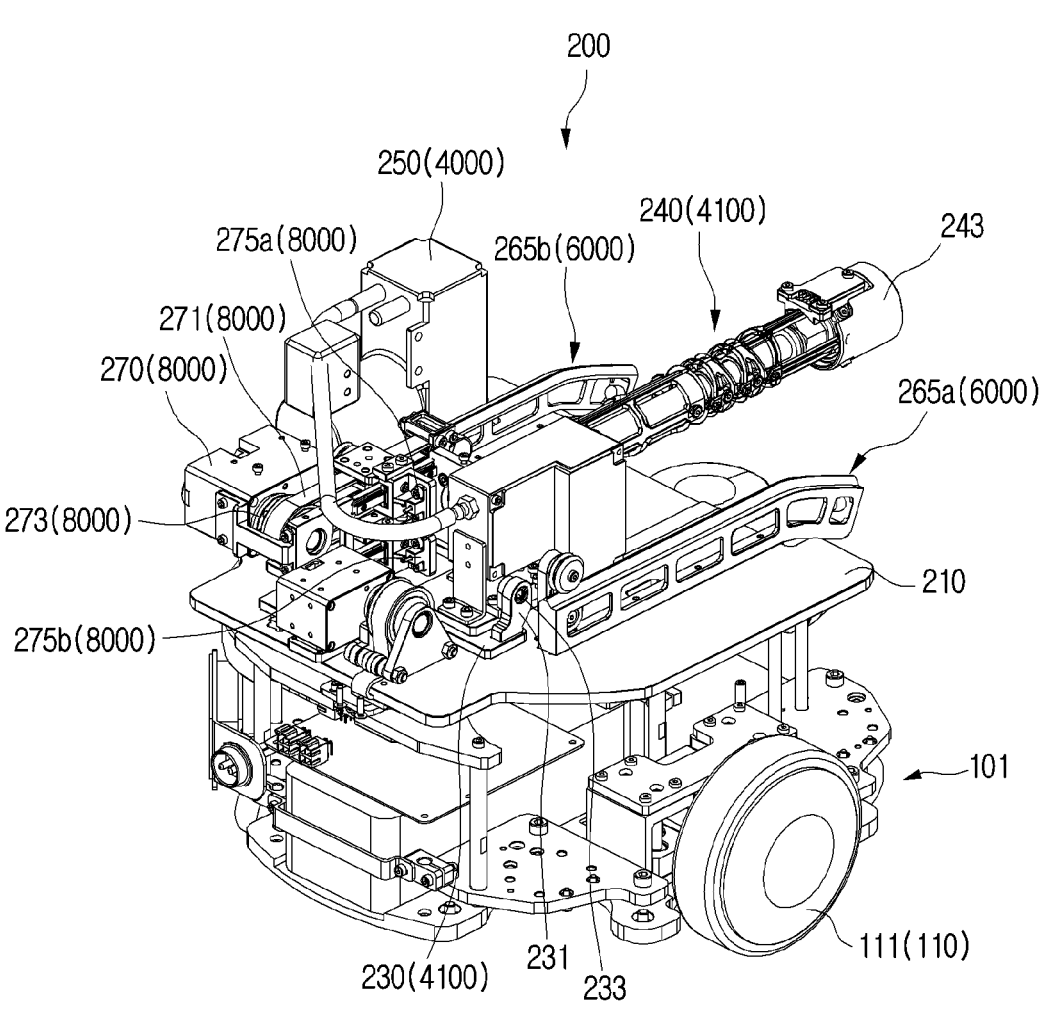

FIG. 7 is a perspective view illustrating the inside of an obstacle clearing device according to an embodiment of the disclosure, and FIG. 8 is an enlarged view illustrating a tilting device of an obstacle clearing device according to an embodiment of the disclosure.

Referring to FIG. 7 and FIG. 8, the tilting device 8000 may include a tilting driving motor 270, a third driving belt 271, a second driving roller 273, a pair of passive rollers 274a, 274b, a first holding block 275a, a second holding block 275b, a first wire 277a, and a second wire 277b.

The tilting driving motor 270 may be fixed to a part of the moving part 230. The tilting driving motor 270 may be a servo motor that can rotate forward and rotate reversely.

The third driving belt 271 may be formed of a loop shape, and to its one side, the second driving roller 273 may be connected, and to its other side, the pair of passive rollers 274a, 274b may be connected. The third driving belt 271 may be arranged in parallel to the arrangement direction of the second driving belt 261 (refer to FIG. 6).

The first holding block 275a and the second holding block 275b may be connected to locations corresponding with each other on the third driving belt 271. For example, the first holding block 275a is connected to the upper part of the third driving belt 271, and the second holding block 275b is connected to the lower part of the third driving belt 271.

The first holding block 275a and the second holding block 275b may move to opposite directions from each other simultaneously when the third driving belt 271 rotates. For example, if the third driving belt 271 rotates forward, the first holding block 275a proceeds forward (e.g., moves to the front side of the robot cleaner 100 or the front side of the base 210), and the second holding block 275b proceeds backward. Also, if the third driving belt 271 rotates reversely, the first holding block 275a proceeds backward, and the second holding block 275b proceeds forward.

One end of the first wire 277a may be connected to the first holding block 275a, and the other end may be connected to the upper end of the rear portion of the head part. One end of the second wire 277b may be connected to the second holding block 275b and the other end may be connected to the upper end of the rear portion of the head part.

The first and second wires 277a, 277b may be driven in opposite directions from each other together with the first and second holding blocks 275a, 275b when the third driving belt 271 rotates.

The arm 240, in some embodiments, is made to release the object by adopting a driving method using the first and second wires 277a, 277b for a tilting operation of the head part 243.

The tilting angle of the head part 243 may be adjusted by driving of the first and second wires 277a, 277b. In this regard, an operation that the head part 243 of the arm 240 is tilted (e.g., a downward tilting operation, an upward tilting operation) by the tilting device 8000 will be described with reference to the drawings.

Figure 9:
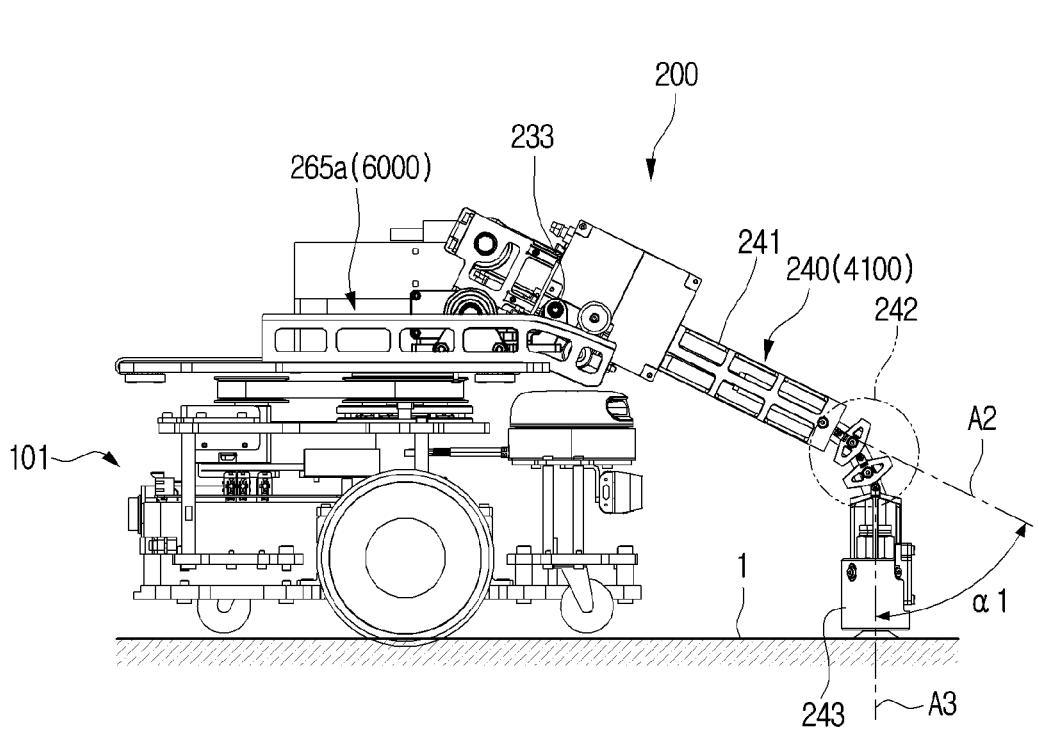
FIG. 9 and FIG. 10 are diagrams illustrating a tilting operation of an arm of an obstacle clearing device according to an embodiment of the disclosure.
Figure 10:
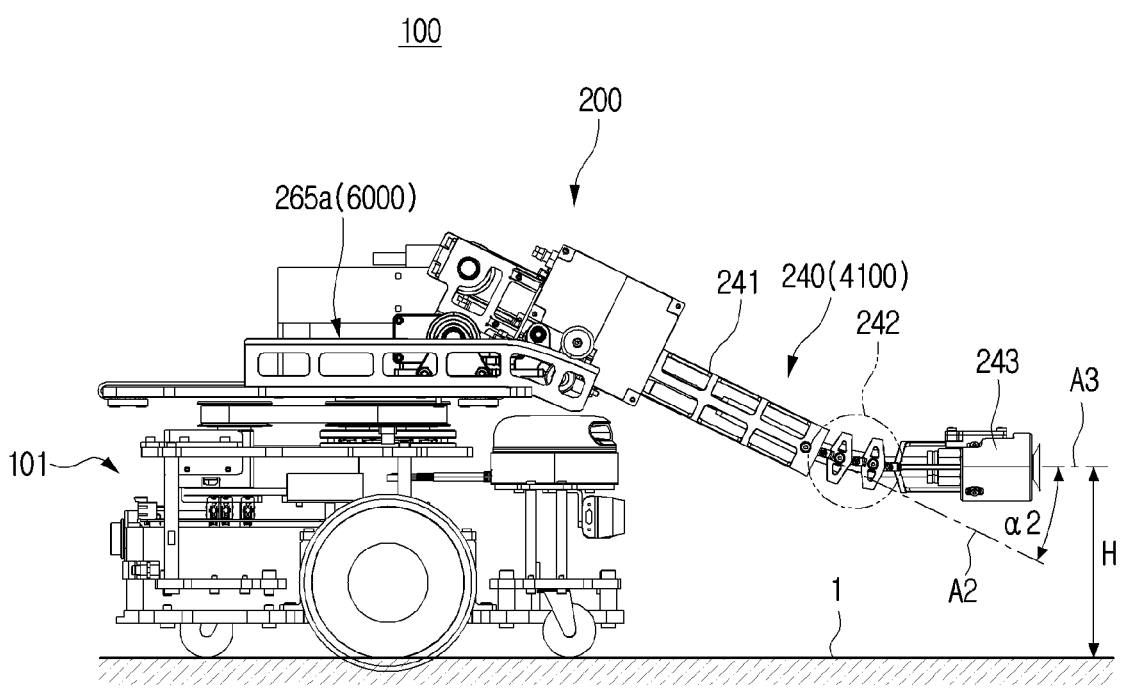

FIG. 9 and FIG. 10 are diagrams illustrating a tilting operation of an arm of an obstacle clearing device according to an embodiment of the disclosure.

Referring to FIG. 9, the arm device 4100 may proceed forward by a specific distance by driving of the sliding device 6000. In this case, when the pair of first and second guide rollers 267a, 267b move to the inclined section G2 of the first and second guide rails 265a, 265b, the arm 240 may be arranged to be inclined downwards.

Here, if the tilting driving motor 270 of the tilting device 8000 is driven to rotate forward, the head part 243 may be tilted downwards by a first tilting angle α1.

For example, by driving of the tilting driving motor 270 to rotate forward, the third driving belt 271 rotates forward and the first holding block 275a proceeds forward, and at the same time, the second holding block 275b proceeds backward. Accordingly, the second wire 277b draws the lower end of the rear portion of the head part 243 to the side of the robot cleaner 100, and the first wire 277a releases the upper end of the rear portion of the head part 243.

By the operation of the tilting device 8000 as above, the bending part 242 of the arm 240 is bent downwards, and the adsorption head 243 of the head part 243 may be tilted to be approximately toward the surface to be cleaned 1. In this case, the downward tilting angle α1 of the head part 243 may be the angle from the central axis A2 of the arm 240 to the central axis A3 of the head part 243.

In case the head part 243 is tilted downwards, the robot cleaner 100 may adsorb (grasp) an obstacle placed on a surface to be cleaned through the adsorption nozzle 244, and as another use, the robot cleaner 100 may collect a foreign substance existing in a corner that is difficult to be accessed by the robot cleaner 100.

Referring to FIG. 10, if the tilting driving motor 270 of the tilting device 8000 is driven to rotate in a reverse manner while the arm 240 is inclined downwards, the head part 243 may be tilted upwards by a second tilting angle α2.

For example, according to driving of the tilting driving motor 270 to rotate in a reverse manner, the third driving belt 271 rotates in a reverse manner and the first holding block 275a proceeds backward, and at the same time, the second holding block 275b proceeds forward. Accordingly, the first wire 277a draws the upper end of the rear portion of the head part 243 to the side of the robot cleaner 100, and the second wire 277b releases the lower end of the rear portion of the head part 243.

By the operation of the tilting device 8000 as above, the bending part 242 of the arm 240 is bent upwards, and the adsorption nozzle 244 of the head part 243 may be tilted to maintain an approximately parallel posture to the surface to be cleaned 1. In this case, the second tilting angle α2 of the head part 243 may be the angle from the central axis A2 of the arm 240 to the central axis A3 of the head part 243.

In case the obstacle clearing device 200 is rotated while the head part 243 is tilted upwards, the robot cleaner 100 may push the obstacle to the arm 240, and move the obstacle off the driving route, for example to a different location.

The bending part 242 of the arm 240 may be constituted in different ways without being limited to the aforementioned structure. Hereinafter, an embodiment regarding the bending part of the arm will be described with reference to the drawings.

Figure 11:
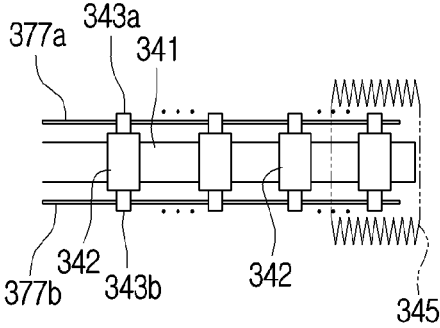
FIG. 11 and FIG. 12 are diagrams illustrating an embodiment of an arm of an obstacle clearing device according to an embodiment of the disclosure.
Figure 12:
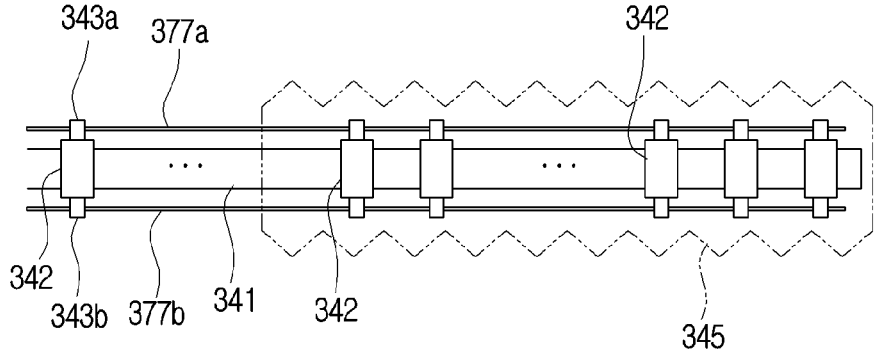

FIG. 11 and FIG. 12 are diagrams illustrating an embodiment of an arm of an obstacle clearing device according to an embodiment of the disclosure.

The arm 340 illustrated in FIG. 11 and FIG. 12 may include a straight part, a bending part, and a head part like the aforementioned arm 240, but the structure of the bending part may be constituted differently from the structure of the bending part of the aforementioned arm 240.

Referring to FIG. 11, the bending part of the arm 340 may include a plurality of connecting members 342 that are slidably inserted into the outer circumferential surface of the suction pipe 341.

In this case, the suction pipe 341 is a component corresponding to the third suction pipe 259 of the aforementioned arm 240, and it may consist of a material of silicon having elasticity. On the front end of the suction pipe 341, the head part is arranged, but illustration thereof is omitted in FIG. 11 and FIG. 12.

The plurality of connecting members 342 may respectively include a first fixing part 343a fixed to the first wire 377a, and a second fixing part 343b fixed to the second wire 377b.

The rear end of an elastic member 345 in the form of bellows may be fixed to the surroundings of the through hole 203 of the second housing 201, and its front end may be fixed to the rear end of the suction head. When the arm 340 projects to the front side of the robot cleaner as in FIG. 12, the length of the elastic member 345 is extended, and exposure of the straight part and the bending part of the arm 340 to the outside may be prevented.

In this case, the suction pipe 341 may maintain a form wherein the rear end part is wound around the inside of the obstacle clearing device 200, and when the arm 340 projects to the front side of the robot cleaner, the wound form may be unwound so that the arm 340 moves together with the head part.

The arm 340 may perform a tilting operation to the upper side or the lower side of the head part by being bent to the upper side or the lower side according to the operation of the tilting device 8000.

Hereinafter, a controlling method of the robot cleaner 100 according to an embodiment of the disclosure will be described with reference to the accompanying drawings.

Figure 13:
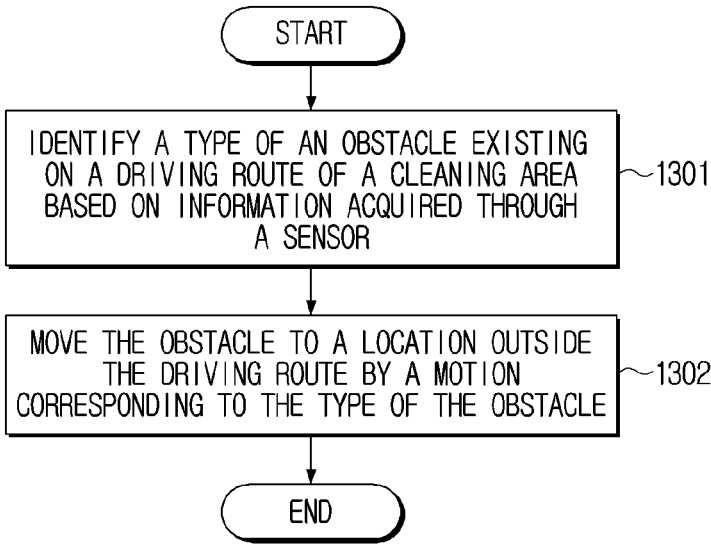
FIG. 13 is a flow chart schematically illustrating a controlling method of a robot cleaner according to an embodiment of the disclosure.

FIG. 13 is a flow chart schematically illustrating a controlling method of a robot cleaner according to an embodiment of the disclosure.

The robot cleaner 100 may identify a type of an obstacle existing on a driving route of a cleaning area based on information acquired through the sensor 120 in the cleaning area (1301, refer to FIG. 13).

Then, the robot cleaner 100 may control the obstacle clearing device 200 and move the obstacle to a location outside the driving route by a motion corresponding to the type of the obstacle (1302, refer to FIG. 13).

Accordingly, even if a user does not take away obstacles interfering with the driving of the robot cleaner such as a toy, a towel, a cable, etc. placed in the cleaning area in advance, the robot cleaner according to an embodiment of the disclosure may continuously perform cleaning while taking away obstacles by itself.

Hereinafter, the controlling method of a robot cleaner according to an embodiment of the disclosure will be described in detail with reference to the drawings.

Figure 14:
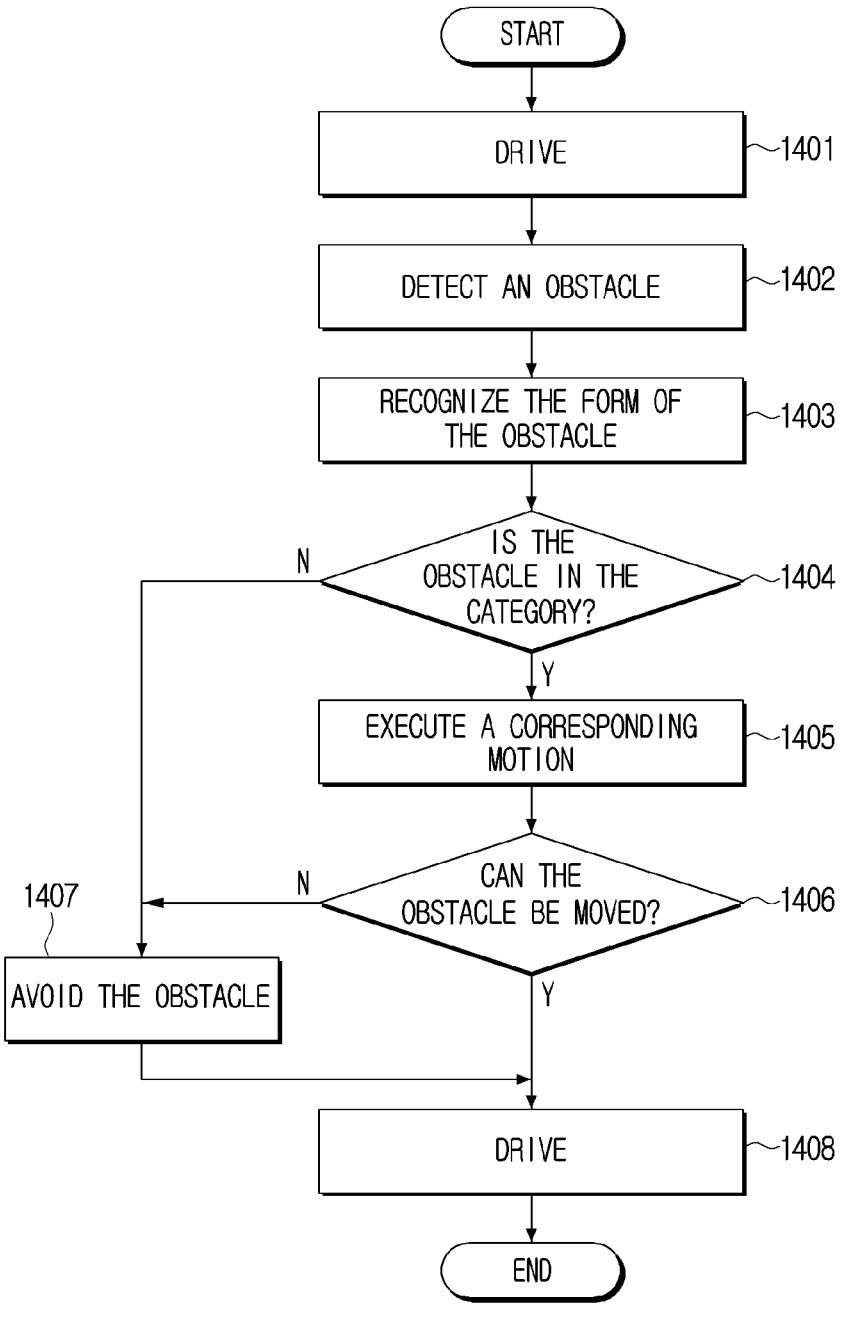
FIG. 14 is a flow chart illustrating in detail a controlling method of a robot cleaner according to an embodiment of the disclosure.

FIG. 14 is a flow chart illustrating in detail a controlling method of a robot cleaner according to an embodiment of the disclosure.

The robot cleaner 100 may map a cleaning area while moving in the cleaning area before cleaning, and store the map for the cleaning area in the memory 130. Mapping may be performed in a state wherein movable obstacles (e.g., they may be lightweight objects such as a toy, a cable, a towel, etc.) have been taken away excluding fixed obstacles (e.g., they may be heavyweight objects such as a closet, a TV stand, a refrigerator, a kitchen table, etc.) in the cleaning area.

The robot cleaner 100 drives in the cleaning area based on the map corresponding to the cleaning area (1401). In this case, the robot cleaner 100 may collect foreign substances on a surface to be cleaned through the cleaning device 150 while driving in the cleaning area (1401, refer to FIG. 14).

The robot cleaner 100 may detect an obstacle existing on the driving route through the sensor 120 while driving (1402, refer to FIG. 14).

The processor 140 may analyze information input through the sensor 120 while the robot cleaner 100 is driving, and acquire information on the type, the size, the location, and the distance of the obstacle. Such information may provide information for determination regarding whether to move or avoid the obstacle for the driving of the robot cleaner 100.

The detected obstacle may be acquired as an image by the sensor 120, and stored in the memory 130. The processor 140 recognizes the form of the obstacle detected by the sensor 120 (1403, refer to FIG. 14). In this case, the sensor 120 may be an RGB camera that can acquire the image of the obstacle.

The processor 140 compares the acquired image of the obstacle with the obstacle forms in the obstacle category stored in the memory 130, and determines whether the image corresponds to one of the classifications (1404, refer to FIG. 14).

If the acquired image of the obstacle is within the obstacle category, the processor 140 controls the obstacle clearing device 200 and executes a motion corresponding to the classification (1405, refer to FIG. 14).

Here, in a program stored in the memory 130, motions for each classification inside the obstacle category may be defined. For example, the motions may be one of a motion of lifting an obstacle from a surface to be cleaned and moving it to a different location, a motion of pushing an obstacle and moving it to a different location, or a motion of avoiding an obstacle without moving it.

For example, explanation regarding a case wherein a motion of clearing an obstacle is the motion of lifting the obstacle from a surface to be cleaned and moving it to a different location will be described with reference to FIG. 15 and FIG. 16.

Figure 15:
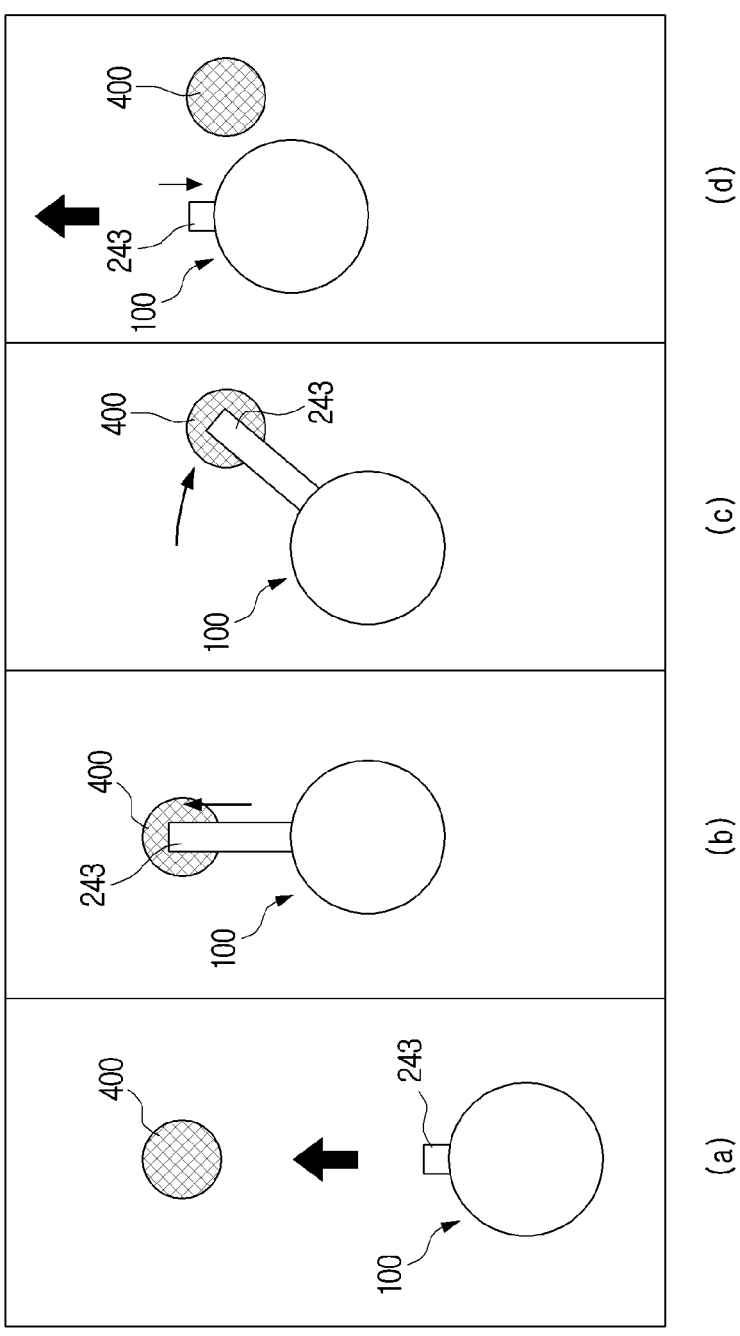
FIG. 15 is a diagram illustrating processes wherein a robot cleaner according to an embodiment of the disclosure adsorbs an obstacle and moves the obstacle to a different location.
Figure 16:
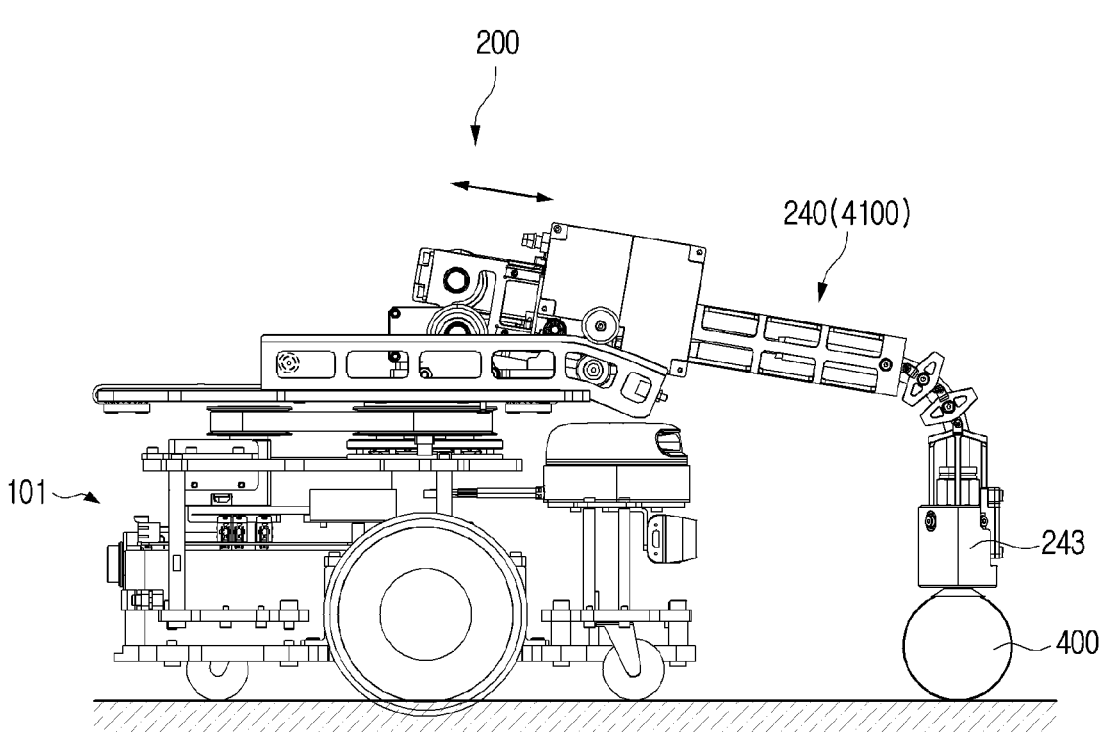
FIG. 16 is a diagram illustrating a state wherein a robot cleaner according to an embodiment of the disclosure adsorbed an obstacle to a head part.

FIG. 15 is a diagram illustrating processes wherein a robot cleaner according to an embodiment of the disclosure adsorbs (grasps) an obstacle and moves the obstacle to a different location, and FIG. 16 is a diagram illustrating a state wherein a robot cleaner according to an embodiment grasps an obstacle to a head part.

The processor 140 controls the sliding device 6000 so that the arm device 4100 proceeds forward (refer to (a) in FIG. 15).

If the pair of the first and second guide rollers 267a, 267b (refer to FIG. 6) move to the inclined section G2 of the first and second guide rails 265a, 265b, the arm 240 that is hinge-connected to the moving part 230 may be arranged to be inclined downwards (refer to FIG. 16). In this state, the processor 140 controls the tilting device 8000 so that the head part 243 is tilted downwards toward the obstacle 400.

The processor 140 controls the vacuum suction pump 250 so that the obstacle 400 is grasped to the adsorption nozzle 244 (refer to (b) in FIG. 15). The processor 140 controls the sliding device 6000 so that the arm device 4100 proceeds backward by a specific distance in order that the obstacle 400 can be lifted from the surface to be cleaned. In this state, the processor 140 controls the rotation device 4200 so that the obstacle 400 grasped to the adsorption nozzle 244 can be moved to a different location from the driving route of the robot cleaner 100 (e.g., a location that does not interfere with the driving of the robot cleaner 100) (refer to (c) in FIG. 15).

The processor 140 controls the sliding device 6000 so that the arm device 4100 proceeds backward by a specific distance in order that the obstacle 400 can be placed on the surface to be cleaned. When the obstacle 400 is placed on the surface to be cleaned, the processor 140 blocks the negative pressure provided to the adsorption nozzle 244, and thereby controls the vacuum suction pump 250 so that the obstacle 400 is separated from the adsorption nozzle 244.

The processor 140 controls the sliding device 6000 to make the arm device 4100 proceed backward. The processor 140 controls the rotation device 4200 so that the arm device 4100 moves to the initial location (refer to (d) in FIG. 15), and then controls the driving device 110 to move along the driving route from which the obstacle 400 has been taken away (1407, refer to FIG. 14).

Meanwhile, if the acquired image of the obstacle is not inside the obstacle category (e.g., the processor 140 determines that excrements of a pet, etc. cannot be moved to the obstacle clearing device 200), the processor 140 executes a motion of avoiding the obstacle without executing a motion of taking away the obstacle (1406, refer to FIG. 14).

The motion of avoiding the obstacle may be, for example, a motion of driving along the surroundings of the obstacle to a degree of not contacting or colliding with the obstacle, and moving the robot cleaner to the driving route continued next to the area occupied by the obstacle.

After the robot cleaner 100 avoids the obstacle, the processor 140 controls the driving device 110 to move the robot cleaner 100 along the driving route.

Meanwhile, a case wherein a motion of clearing an obstacle falls under a motion of pushing the obstacle and moving it to a different location will be explained with reference to FIG. 17.

Figure 17:
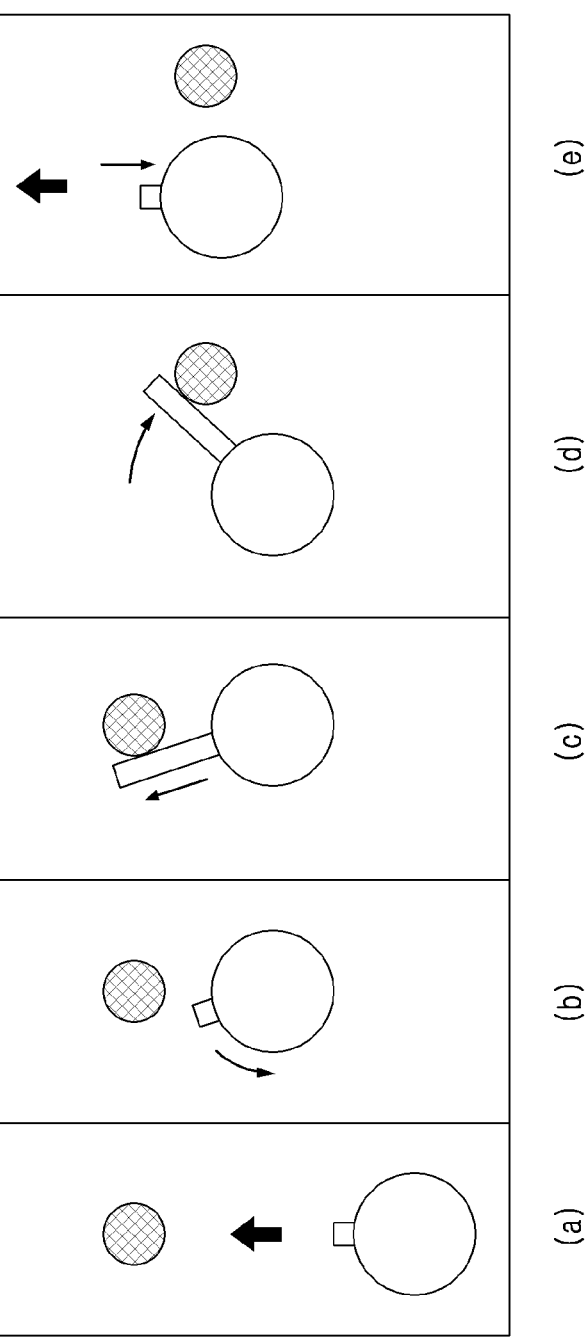
FIG. 17 is a diagram illustrating processes wherein a robot cleaner according to an embodiment of the disclosure pushes an obstacle and moves the obstacle to a different location.

FIG. 17 is a diagram illustrating processes wherein a robot cleaner according to an embodiment of the disclosure pushes an obstacle and moves the obstacle to a different location.

The processor 140 controls the driving device 110 to move the robot cleaner to the distance that the obstacle 400 can be pushed to the arm 240, and then to stop the robot cleaner (refer to (a) in FIG. 17).

The processor 140 controls the rotation device 4200 to rotate the obstacle clearing device 200 to the left side by a specific angle so that one side of the obstacle 400 can be pushed to the arm 240 (refer to (b) in FIG. 17).

The processor 140 controls the sliding device 6000 to make the arm device 4100 proceed forward (refer to (c) in FIG. 17).

When the pair of the first and second guide rollers 267*a*, 267*b* move to the inclined section G2 of the first and second guide rails 265*a*, 265*b*, the arm 240 that is hinge-connected to the moving part 230 may be arranged to be inclined downwards. In this state, the processor 140 controls the tilting device 8000 so that the head part 243 is tilted upwards (refer to FIG. 10).

In this state, the processor 140 controls the rotation device 4200 to rotate the obstacle clearing device 200 to the right side by a specific angle and move the obstacle 400 to the arm 240, and thereby move the obstacle 400 to a different location from the driving route of the robot cleaner 100 (e.g., a location that does not interfere with the driving of the robot cleaner 100) (refer to (d) in FIG. 17).

The processor 140 controls the sliding device 6000 so that the arm device 4100 proceeds backward by a specific distance. The processor 140 controls the rotation device 4200 so that the arm device 4100 moves to the initial location, and then controls the driving device 110 to move along the driving route from which the obstacle 400 has been taken away (refer to (e) in FIG. 17).

Meanwhile, when the robot cleaner 100 executes a motion of moving the obstacle 400 by lifting or moving the obstacle 400 by pushing, an emergency situation wherein the obstacle 400 cannot be moved to a location outside the driving route due to the weight of the obstacle 400 may occur.

For example, after the processor 140 drives the rotation driving motor 220 to execute a motion of moving the obstacle 400 by lifting or moving the obstacle 400 by pushing, in case it is determined that an operation signal of the rotation driving motor 220 received from the encoder 123 (refer to FIG. 18) is different from an output signal or an operation signal was not input, the processor 140 may determine that the weight of the obstacle 400 exceeds the threshold torque of the rotation driving motor 220, and recognize the situation as an emergency situation.

The processor 140 may control the driving device 110 to execute a motion that the robot cleaner 100 avoids the obstacle 400.

In this case, the processor 140 may stop the operation of the rotation driving motor 220, and then reset the rotation axis of the rotation driving motor 220 to the initial location. Also, in case it is determined that the rotation axis of the rotation driving motor 220 cannot return to the initial location based on the signal input through the encoder 123, the processor 140 may output a warning message and a warning sound indicating the operation-disabled state to the output part 180 (refer to FIG. 18) of the obstacle clearing device 200.

As illustrated in FIG. 18, the robot cleaner 100 may not only include the driving device 110, the sensor 120, the memory 130, the processor 140, and the obstacle clearing device 200, but may also further include a cleaning device 150, a communication part 160, an input part 170, and an output part 180, etc. However, these components are merely exemplary ones, and in implementing the disclosure, it is obvious that new components can be added in addition to these components, or some components can be omitted. Meanwhile, in describing FIG. 18, overlapping explanation to FIG. 1 to FIG. 18 will be omitted.

The sensor 120 may include a LiDAR sensor 121, a camera 122, an encoder 123, a 3D sensor 124, and a gyro sensor 125.

The LiDAR sensor 121 may irradiate laser while rotating by 360 degrees, and detect the distance between the robot cleaner 100 and an ambient object, and provide the detected information to the processor 140.

The camera may photograph the surroundings of the robot cleaner 100, and acquire at least one obstacle image for the surroundings of the robot cleaner 100, and provide the acquired obstacle image to the processor 140. Here, the acquired image may be a new obstacle that was not included when mapping the cleaning area (e.g., a glass product, a book, a cable, a doll, a toy, excrements of a pet, etc.).

The encoder 123 may detect an operation signal of the rotation driving motor 220 rotating the obstacle clearing device 200 to the left side or the right side when performing a motion for clearing an obstacle, and provide the detected information to the processor 140. Also, the encoder 123 may detect the number of rotations of the wheels respectively installed on the left side and the right side of the main body of the robot cleaner 100, and provide the detected information to the processor 140.

The 3D sensor 124 may detect the distance between the robot cleaner 100 and an ambient object, and provide the detected information to the processor 140.

The gyro sensor 125 may detect the angular velocity of the robot cleaner 100, and provide the detected information to the processor 140.

The cleaning device 150 may suction foreign substances. For this, the cleaning device 150 may include a brush 151, a foreign substance collecting bin 153, and a suction fan motor 155. In an embodiment, a suction device 2000 includes the brush 151, the foreign substance collecting bin 153, and the suction fan motor 155. Specifically, the processor 140 may rotate the brush 151 for collecting foreign substances and generate a suction force through the suction fan motor 155, and suction foreign substances from a surface to be cleaned on which the robot cleaner 100 is driving. The processor 140 may control the cleaning device 150 to perform a cleaning operation while the robot cleaner 100 is moving in the cleaning area. Here, the suctioned foreign substances may be housed in the foreign substance collecting bin 153. Also, depending on embodiments, the cleaning device 150 may further include a cloth for cleaning a floor.

The communication part 160 may include a circuit, and perform communication with an external device. The processor 140 may receive various kinds of data or information from an external device connected through the communication part 160, and also transmit various kinds of data or information to the external device.

Specifically, the processor 140 may transmit data related to the robot cleaner 100 to a server through the communication part 160. Then, when a control signal for controlling the robot cleaner 100 is received from the server through the communication part 160, the processor 140 may control the operation of the robot cleaner 100 based on the received control signal. For example, the processor 140 may control the operations that the robot cleaner 100 performs when driving in a cleaning area (e.g., wall cleaning, obstacle cleaning, whether to operate a cleaning tool, etc.), and adjust a motion of moving an obstacle to a different location from the driving route.

The input part 170 may include a circuit, and receive input of user instructions for setting or selecting various kinds of functions supported at the robot cleaner 100. For this, the input part 170 may include a plurality of buttons, and may be implemented as a touch screen that can simultaneously perform the function of the display 181.

In this case, the processor 140 may control the operation of the robot cleaner 100 based on a user instruction input through the input part 170. For example, the processor 140 may control the robot cleaner 100 based on on/off instructions of the robot cleaner 100, on/off instructions of the functions of the robot cleaner 100, etc. input through the input part 170 of the robot cleaner 100. Also, the processor 140 may control the operations that the robot cleaner 100 performs when driving in a cleaning area (e.g., wall cleaning, obstacle cleaning, whether to operate a cleaning tool, etc.) based on a user instruction input through the input part 170, and adjust an interval at which a zig zag motion may be performed.

The output part 180 may include a display 181 and a speaker 182.

The display 181 may display various kinds of information. For this, the display 181 may be implemented as a liquid crystal display (LCD), etc., and it may also be implemented as a touch screen that can simultaneously perform the function of the input part 170.

Specifically, the processor 140 may display information related to the operations of the robot cleaner 100 (e.g., information such as the cleaning proceeding time, the current cleaning mode (i.e., the suction strength), battery information, whether the robot cleaner 100 is charged, whether the dust bin is filled up with dust, an error state, etc.), and a message guiding an emergency situation when clearing an obstacle (e.g., in case an obstacle could not be moved to a different location due to the weight of the obstacle) on the display 181.

The speaker 182 may output audio. Specifically, the processor 140 may output various notification sounds or voice guide messages related to the operations of the robot cleaner 100 through the speaker 182. For example, in case an obstacle is not moved due to the weight of the obstacle when the obstacle is taken away from the driving route (attempted to be moved off the route) by using the obstacle clearing device 200, the processor 140 may control the speaker 182 to output a sound notifying that it is an emergency situation.

According to an embodiment, methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

Further, each of the components (e.g.: a module or a program) according to the various embodiments of the disclosure as described above may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner.

In addition, operations performed by a module, a program, or other components according to the various embodiments may be executed sequentially, in parallel, repetitively, or heuristically. Or, at least some of the operations may be executed in a different order or omitted, or other operations may be added.

Meanwhile, the term "a part" or "a module" used in the disclosure includes a unit consisting of hardware, software, or firmware, and it may be interchangeably used with terms, for example, logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

Also, the various embodiments of the disclosure may be implemented as software including instructions stored in machine-readable storage media, which can be read by machines (e.g.: computers). Here, the machines refer to devices that call instructions stored in a storage medium, and can operate according to the called instructions, and the devices may include the electronic device according to the aforementioned embodiments (e.g.: the electronic device 100).

In case an instruction is executed by a processor, the processor may perform a function corresponding to the instruction by itself, or by using other components under its control. An instruction may include a code that is generated or executed by a compiler or an interpreter.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A robot cleaner comprising:
   a driving device configured to move the robot cleaner along a route;
   a brush;
   a sensor configured to detect an obstacle on the route;
   a hinged arm configured to move the obstacle;
   memory configured to store obstacle category data; and
   at least one processor configured to:
     control the driving device to move the robot cleaner along the route,
     control the sensor to detect the obstacle at a first location in the route,
     using the obstacle category data, determine whether the obstacle is of a first type, and
     based on the obstacle being determined to be of the first type, control an operation for moving the obstacle away from the route based on the hinged arm moving the obstacle to a second location that is toward a left side of the route or toward a right side of the route,
     wherein the controlling the operation for moving the obstacle away from the route completes the operation for moving the obstacle away from the route by moving the obstacle to the second location that is toward a left side of the route or toward a right side of the route or, based on a weight of the obstacle exceeding a threshold level, stops the operation for moving the obstacle away from the route.

2. The robot cleaner of claim 1, wherein the at least one processor is further configured to control the driving device so that the robot cleaner avoids the obstacle.

3. The robot cleaner of claim 2, wherein the at least one processor is further configured to control the driving device so that the robot cleaner avoids the obstacle that remains in the first location of the route.

4. The robot cleaner of claim 1, wherein the at least one processor is further configured to:

based on determining that the obstacle is not of the first type, control the driving device so that the robot cleaner avoids the obstacle and not move the obstacle from the route.

5. The robot cleaner of claim 1, wherein the sensor is a LiDAR sensor, a camera, a depth sensor, or an IR stereo sensor.

6. The robot cleaner of claim 1, wherein the hinged arm comprises an additional sensor configured to recognize the obstacle.

7. The robot cleaner of claim 1, wherein the obstacle in the first location obstructs the robot cleaner from moving along the route.

8. The robot cleaner of claim 7, wherein the robot cleaner travels on a surface and the first location and the second location are on the surface.

9. The robot cleaner of claim 8, wherein when the at least one processor completes the operation for moving the obstacle away from the route by moving the obstacle to the second location that is toward the left side of the route or toward the right side of the route, the at least one processor controls the driving device for the robot cleaner to continue along the route while the obstacle is at the second location.

10. A method of a robot cleaner including a hinged arm for moving obstacles, the method comprising:

driving the robot cleaner along a route;

detecting by a sensor, an obstacle at a first location on the route;

determining whether the obstacle is of a first type; and based on the obstacle being determined to be of the first type, controlling an operation for moving the obstacle away from the route based on the hinged arm moving the obstacle to a second location that is toward a left side of the route or toward a right side of the route, wherein the controlling the operation for moving the obstacle away from the route completes the operation for moving the obstacle away from the route by moving the obstacle to the second location that is toward a left side of the route or toward a right side of the route or, based on a weight of the obstacle exceeding a threshold level, stops the operation for moving the obstacle away from the route.

11. The method of claim 10 further comprising, based on the weight of the obstacle exceeding the threshold level, driving the robot cleaner to avoid the obstacle.

12. The method of claim 11 further comprising, based on the weight of the obstacle exceeding the threshold level, driving the robot cleaner to avoid the obstacle that remains in the first location of the route.

13. The method of claim 10, based on determining that the obstacle is not of the first type, controlling the driving device so that the robot cleaner avoids the obstacle and not move the obstacle from the route.

14. The method of claim 10, wherein the sensing is performed by a LiDAR sensor, a camera, a depth sensor, or an IR stereo sensor.

15. The method of claim 10, wherein the obstacle in the first location obstructs the robot cleaner from moving along the route.

16. The method of claim 15, wherein the robot cleaner travels on a surface and the first location and the second location are on the surface.

17. The method of claim 16, wherein when the at least one processor completes the operation for moving the obstacle away from the route by moving the obstacle to the second location that is toward the left side of the route or toward the right side of the route, the at least one processor controls the driving device for the robot cleaner to continue along the route while the obstacle is at the second location.

18. A non-transitory computer readable medium storing a computer program to be executed by a computer, the computer program causing the computer to perform a method including:

driving and the robot cleaner along a route;

determining whether the obstacle is of a first type; and based on the obstacle being determined to be of the first type, controlling an operation for moving the obstacle away from the route based on the hinged arm moving the obstacle to a second location that is toward a left side of the route or toward a right side of the route, wherein the controlling the operation for moving the obstacle away from the route completes the operation for moving the obstacle away from the route by moving the obstacle to the second location that is toward a left side of the route or toward a right side of the route or, based on a weight of the obstacle exceeding a threshold level, stops the operation for moving the obstacle away from the route.

* * * * *